Aug. 26, 1941.          W. S. CAMPBELL          2,253,761
CONVEYER
Filed April 1, 1940          2 Sheets-Sheet 1

Inventor
Willard S Campbell
by James R. McKnight
his Attorney

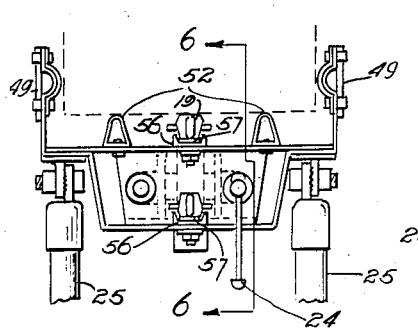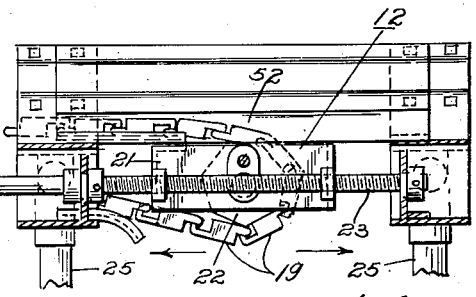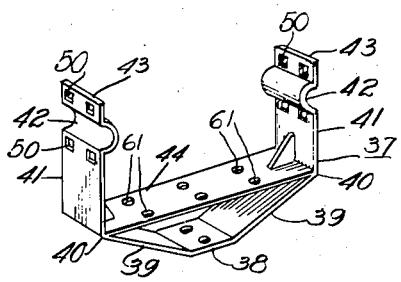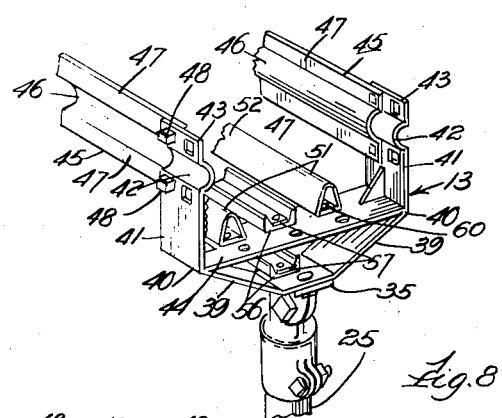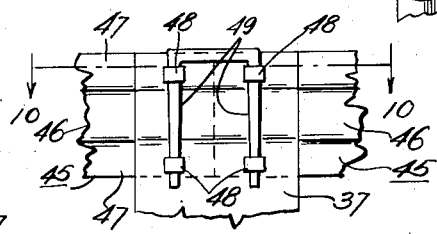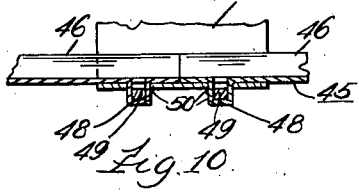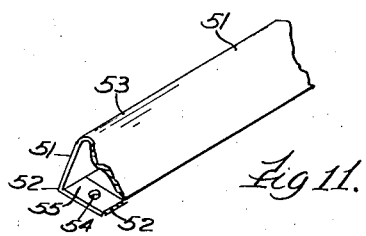

Patented Aug. 26, 1941

2,253,761

UNITED STATES PATENT OFFICE 2,253,761

CONVEYER

Willard S. Campbell, Hampshire, Ill., assignor, by mesne assignments, to Cherry-Burrell Corporation, Chicago, Ill., a corporation of Delaware Application April 1, 1940, Serial No. 327,145

3 Claims. (Cl. 198—204)

This invention relates to a conveyer for objects such as cases, milk cans, beer barrels or other similar articles.

Among the objects of my invention is to provide a conveyer having pressed or formed metal parts providing a lighter and stronger construction; the parts being so formed that they may be packed and shipped in normal sized and shaped bundles without waste space and easily assembled and installed for immediate use. My removable clamping members eliminate the need of welding or cumbersome bolt constructions. My rails with their rounded portions present minimum surface for friction with the conveyed objects and have no corners to catch and retain dirt, thereby providing maximum sanitary conditions. My swingable adjustable legs insure vertical supporting means regardless of the incline of the supported object. My conveyer contemplates such other objects, advantages and capabilities as will later more fully appear and which are inherently possessed by my invention.

While I have shown in the accompanying drawings a preferred form of my invention, yet I desire it understood that the same is susceptible of modification and change without departing from the spirit of my invention.

Figure 1:
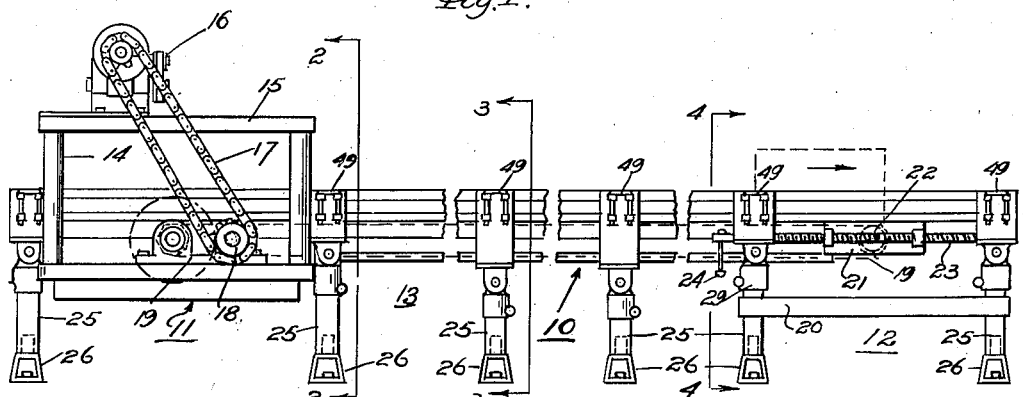
Figure 2:
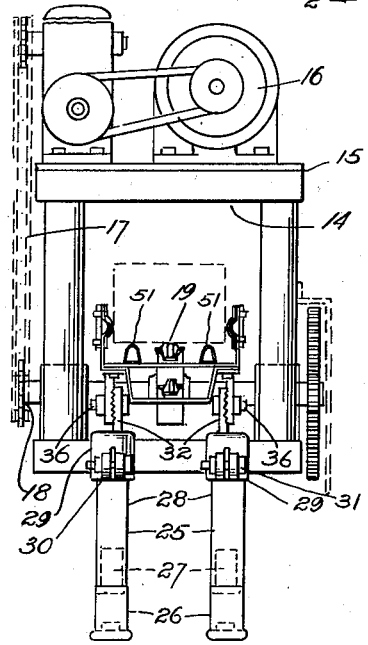
Figure 3:
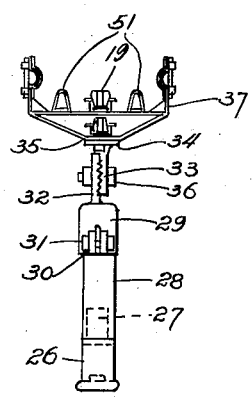
Figure 4:
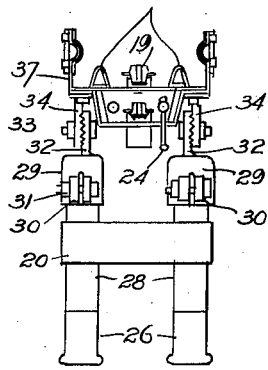

Referring to the drawings, Fig. 1 is a side elevational view partly broken of my conveyer; Fig. 2 is an end view of the power unit as shown on line 2—2 of Fig. 1; Fig. 3 is a detailed sectional view of the conveyer frame shown on line 3—3 of Fig. 1; Fig. 4 is a sectional view of the take-up unit shown on line 4—4 of Fig. 1; Fig. 5 is an enlarged detailed sectional view of the take-up unit; Fig. 6 is a detailed sectional view of the take-up unit on line 6—6 of Fig. 5; Fig. 7 is a detailed perspective view of my supporting yoke; Fig. 8 is a detailed sectional view of my supporting yoke with parts attached; Fig. 9 is a detailed view of the yoke showing a fastening pin in place; Fig. 10 is a detailed sectional view of the yoke on line 10—10 of Fig. 9; Fig. 11 is a detailed perspective view of a portion of the guide track.

The embodiment selected to illustrate my invention comprises a conveyer 10 having on one end a power unit 11, on the other end a take-up unit 12 and a conveyer frame construction 13 therebetween.

The power unit 11 has a frame 14 with a top portion 15 which supports a motor 16 for moving through transmission means 17, wheel 18 and chain 19.

The take-up unit 12 has a frame 20 to which is attached a housing 21, which supports an idler wheel 22. The idler wheel 22 serves as a returning member for the chain 19. A spindle 23 is screw threaded to the housing 21 and upon the spindle 23 being turned in one or the other direction by manual operation of handle 24 the housing 21 and thus the idler wheel 22 are moved to a more forward or rear position to tighten or loosen the chain 19 as desired.

The conveyer frame construction 13 has a plurality of spaced legs 25. Each of said legs 25 has a hollow rounded bottom portion or base 26 with an opening therein to receive a bolt or other suitable means for attaching the leg to the floor or ground. The base 26 has an upper shank 27 removably driven into the bottom of a hollow pipe or tube 28. The pipe may be of any desired height or length. The upper end of the pipe 28 removably fits within the lower hollow portion of a head piece or cap casting 29. Said cap casting 29 has a split side flange 30 tightenable by a bolt 31. Said cap casting 29 has an extension 32 at its upper portion with a knurled surface to engage the knurled surface of lower flange 33 of bracket 34. The bracket 34 has a flat top portion 35 at substantially a right angle to flange 33. Bracket 34 may be swung at a desired angle with reference to extension 32 so that the top surface 35 may contact and support an object at a desired angle, said extension 32, pipe 28 and base 26 still remaining perpendicular to the ground or floor. A bolt 36 removably attaches bracket 34 to tube 28 through flange 33 and extension 32 respectively.

The legs 25 are spaced and support yokes 37. Each of my yokes is formed of pressed or formed metal, such as steel. Each yoke has a bottom portion 38 which rests upon the top flat portion 35 of leg 25. Extending diagonally upwardly and outwardly from bottom portion 38 on either side are diagonal portions 39, which continue at 40 to form side portions 41. The side portions 41 end with inwardly rounded or curved portions 42 above which are abbreviated straight top portions 43. At 40 a connecting member 44 extends from one side to the other of yoke 37.

Side rails 45 have a rounded central portion 46 and flat portions 47 on either side thereof to accommodate clips 48. The side rails are positioned so that rounded portions 46 lie against and over rounded portions 42 of the yokes 37. Clips 48 extend through openings 50 and tapered pins 49 extend through clips 48 to removably attach the side rails 45 to the yokes 37.

Pressed or formed from metal such as steel are guide tracks 51 having spaced edges 52 and a rounded top portion 53. Ordinarily a pair of spaced guide tracks 51 extend the length of conveyer frame 13 and lie with edges 52 down on connecting members 44 of yokes 37. They may be removably attached by running a bolt 60 upwardly through an opening 61 in connecting member 44 and an opening 54 in flat portion 55 extending between edges 52.

Between guide tracks 51 a chain track or channel guide 56 lies on top of connecting members 44 of yokes 37. The return portion of the channel guide 56 rests on the top of bottom portion 38 of yokes 37. The chain 19 travels within channel guide 56 and on a steel liner 57 whereby the chain friction is reduced to a minimum and the life of the chain is prolonged.

The legs of the power unit 11 and take-up unit 12 have the same construction as the legs of my conveyer construction. The frame 20 of my take-up unit 12 has yokes 37, side rails 45, guide tracks 51 and channel guide 56 continuations from the conveyer frame as heretofore set forth. The frame 13 of my power unit 11 is likewise constructed wherever such parts are necessary.

In use it will be seen that a case or can travelling on my conveyer will suffer a minimum of friction. The rounded portions 46 of the side rails 45 and the rounded top portions 53 of the guide tracks when contacted will furnish practically no resistance. There is no damage of denting or scratching the conveyed objects. Ease of cleaning and maximum sanitation is apparent as there are no corners or catch-alls for dirt. Even the yokes are rounded to fit within the rounded side rails to carry out applicant's conception of streamlined smoothness for maximum sanitary conditions and minimum friction.

With my adjustable legs my conveyer can be built on an incline, but with every leg in straight and perpendicular position. This insures perfect and continued support.

The parts are made of pressed metal so that strength is maintained with decrease in weight. Because the parts are so fabricated it is possible to ship the parts knocked down and nested in a minimum of freight space. With the elimination of cutting, riveting and welding, and the attachment of removable parts by clips, assembly and installation may be made by a single individual in quick time at a minimum of cost.

Having thus described my invention, I claim:

1. In a conveyer, a plurality of spaced legs, a plurality of spaced yokes supported on top of said legs, said yokes having spaced flat sides, each of said sides having a curved portion, spaced flat side rails, each of said side rails having a correspondingly curved portion, said side rails positioned against the sides of said yokes with the curved portions of the rails nesting with the curved portions of the sides of said yokes, and fastening means for removably attaching the side rails to the yokes.

2. In a conveyer, a plurality of spaced legs, a plurality of spaced yokes supported on top of said legs, said yokes having spaced side portions consisting of a straight lower portion, an inwardly curved portion and a straight upper portion, said straight portions having openings, spaced side rails consisting of a straight lower portion, an inwardly curved portion and a straight upper portion, said straight portions having clips, said side rails being so positioned that the outer side of the curved portion nests against the inner side of the curved portion of the yoke and the outer sides of the upper and lower straight portions of the side rails lie against the respective inner sides of the upper and lower straight portions of the yokes with the clips of the side rails within the openings of the yokes, said clips having openings, and tapered pins extending through the openings in said clips.

3. In a conveyer, a plurality of spaced legs, a plurality of spaced yokes, each of said yokes having a flat central portion, side portions extending outwardly and upwardly from said flat central portion and a flat connecting portion extending between said side portions and spaced above said flat central portion, the bottom of the flat central portion of said yokes resting on the top portion of said legs, spaced side rails attached to the side portions of said yokes, a chain guide mounted on and extending between said connecting portions of said yokes, a return chain guide mounted on and extending between said flat central portions of said yokes, and a power operated carrier chain travelling within said chain guides.

WILLARD S. CAMPBELL.